United States Patent [19]

Tang et al.

[11] Patent Number: 5,242,881
[45] Date of Patent: Sep. 7, 1993

[54] PEROVSKITE-TYPE RARE EARTH COMPLEX OXIDE COMBUSTION CATALYSTS

[75] Inventors: Youqi Tang; Bingxiong Lin, both of Beijing, China

[73] Assignee: Peking University, Beijing, China

[21] Appl. No.: 624,319

[22] Filed: Dec. 4, 1990

[30] Foreign Application Priority Data

Jul. 26, 1990 [CN] China ................................ 90104880

[51] Int. Cl.⁵ .................... B01J 21/04; B01J 21/08; B01J 23/10; B01J 37/02

[52] U.S. Cl. .................... 502/244; 502/303; 502/241; 502/242; 502/245; 502/250; 502/251; 502/252; 502/525

[58] Field of Search ............... 502/303, 525, 241, 242, 502/244, 245, 250, 251, 252

[56] References Cited

U.S. PATENT DOCUMENTS

| | | | |
|---|---|---|---|
| 3,897,367 | 7/1975 | Lauder | 502/303 |
| 4,049,583 | 9/1977 | Lauder | 502/303 |
| 4,055,513 | 10/1977 | Wheelock | 502/303 |
| 4,111,848 | 9/1978 | Torii et al. | 502/333 |
| 4,134,852 | 1/1979 | Volin | 502/302 |
| 4,337,028 | 6/1982 | Angwin et al. | 502/302 X |
| 4,446,011 | 5/1984 | Wheelock et al. | 502/303 |
| 4,485,191 | 11/1984 | Sekido et al. | 423/213.5 X |
| 4,692,429 | 9/1987 | Sekido et al. | 502/303 |
| 4,748,143 | 5/1988 | Tabata et al. | 502/302 X |
| 5,055,440 | 10/1991 | Chu et al. | 502/303 |
| 5,093,301 | 3/1992 | Chu et al. | 502/303 |

FOREIGN PATENT DOCUMENTS

| | | | |
|---|---|---|---|
| 59-216633 | 12/1984 | Japan . | |
| 60-51544 | 3/1985 | Japan . | |
| 60-51545 | 3/1985 | Japan . | |
| 60-175547 | 9/1985 | Japan | 502/303 |
| 61-234947 | 10/1986 | Japan | 502/525 |
| 61-274748 | 12/1986 | Japan . | |

OTHER PUBLICATIONS

N. Mizuno et al., Chemistry Letters, pp. 1333–1336, 1986.

*Primary Examiner*—W. J. Shine
*Assistant Examiner*—Douglas J. McGinty
*Attorney, Agent, or Firm*—Darby & Darby

[57] ABSTRACT

The present invention relates to rare earth complex oxide combustion catalysts wherein perovskite-type rare earth complex oxide active components are carried on a support using mullite as the main phase. The present invention relates also to a process for preparing a rare earth complex oxide combustion catalyst which comprises impregnating the support with the solution of the metallic ions prepared by the $ABO_3$ stoichiometry and then drying and calcining it. Furthermore, the present invention relates to the use of the said catalyst as a combustion catalyst for CO in the fluid catalytic cracking (FCC) process of petroleum refining.

19 Claims, 2 Drawing Sheets

PEROVSKITE-TYPE RARE EARTH COMPLEX OXIDE COMBUSTION CATALYSTS

BACKGROUND OF THE INVENTION

1. Field of the Invention

The present invention relates to perovskite-type rare earth complex oxide combustion catalysts, a process for their preparation and their use in the fluid catalytic cracking (FCC) process of petroleum refining. More specifically, the present invention relates to perovskite-type rare earth complex oxide combustion catalysts with a support in which mullite ($3Al_2O_3 \cdot 2SiO_2$) is the main phase, a process for their preparation and their use as a catalyst for the combustion of carbon monoxide in the fluid catalytic cracking process of petroleum refining.

2. The Prior Art

Up to now the active components of a catalyst for the combustion of carbon monoxide in the fluid catalytic cracking process of petroleum refining have all been noble metals, such as platinum, palladium etc. Since the seventies the perovskite-type rare earth complex oxides used as the active components of the catalyst have attracted wide attention, and their catalytic oxidizing function for carbon monoxide and hydrocarbons have been confirmed (T. Nakamura, M. Misono, et al, Nippon Kagaku Kaishi 1679, 1980; N, Yamazoe, et al, Shokubai Vol. 25, 196, 1983). At present, catalysts using perovskite-type complex oxides as the active components are generally carried on $\gamma$-$Al_2O_3$ (U.S. Pat. No. 3,897,367, 1975; M. Ohasi, Shokubai Vol. 29, 598, 1989; Japan Patent Publications sho-53-7591; sho-61-274748) or carried on cordierite (N. Mizuno, et al, Chemistry Letters 1333–1336, 1986). However, the supports mentioned above will inevitably react chemically with the complex oxide; as a result, aluminum-containing perovskite or aluminum-containing spinel with non-catalytic activity is formed, causing part of the active components to be damaged, so that the activity of the catalysts dropped universally. In order to solve the problem, methods to increase the content of the active components or to deactivate the surface by pre-coating with active components have been adopted to maintain the desired activity. For example, N. Mizuno et al first impregnated $La_2O_3$ onto cordierite, then carried the active components; some others use mullite after coating it with a layer of $\gamma$-alumina or zirconia as the support (Japan Patent Publications, sho 60-51545). These methods make the manufacture of the catalysts complicated and increase their cost. Still others bypass this process by using the active components as catalysts alone without support. Obviously, such a method fails to give full play to the role of the active components. At present, in order to substitute the cheap rare earth complex oxides for noble metals (e.g. platinum, palladium etc.), people are trying to develop perovskite-type rare earth complex oxide combustion catalysts for treating automobile exhaust gas, so that the problem of noble metal shortage can be solved and production costs can be reduced. Nevertheless, no reports have appeared so far on the use of the above catalysts for the combustion of carbon monoxide in the catalytic cracking process of petroleum refining.

SUMMARY OF THE INVENTION

The present inventors have discovered, on the basis of structural chemistry research, that mullite is a suitable support for rare earth complex oxide. The mullite consists of $3Al_2O_3 \cdot 2SiO_2$—$2Al_2O_3 \cdot SiO_2$. Such a mullite crystal belongs to the orthorhombic system with a space group of $D_{2h}^9$—Pbam and the parameters of the unit cell are approximately $a_0=7.546$ Å, $b_0=7.660$ Å and $c_0=2.884$ Å. As the crystal structure of mullite and the perovskite-type rare earth complex oxides are both imperfect types and their crystallogical parameters match each other, the former easily adheres to and disperses on the latter. Moreover, mullite does not react with the active components chemically, so that the function of the active components can be effectively brought into full play.

Therefore, the present invention relates to perovskite-type rare earth complex oxide combustion catalysts comprising the perovskite-type active components as shown in the following general formula (I)

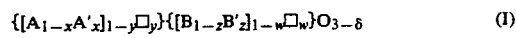

$$\{[A_{1-x}A'_x]_{1-y}\square_y\}\{[B_{1-z}B'_z]_{1-w}\square_w\}O_{3-\delta} \qquad (I)$$

wherein A represents rare earth metal element, preferably La, Ce or mixed rare earths and most preferably, La or Ce; A' represents alkaline earth metal element, preferably Ca, Sr or Ba and most preferably Ca or Sr; $\square$ represents the vacancy in the structure; B and B' represent the transition metal elements, preferably Ti, Cr, Co, Mn, Cu, Fe or Ni, and most preferably Ti, Cr, Co or Mn; $0 \leq x \leq 0.9$; $0 \leq y \leq 0.2$; $0 \leq z \leq 0.9$; $0 \leq w \leq 0.05$; $0 \leq \delta \leq 0.8$. And a support with mullite as the main phase, wherein the said active components are carried directly on the said support.

The present invention further relates to the process for preparing the above-mentioned catalyst, which compriseds;

(1) An aqueous solution of the soluble salts with a total concentration of the metallic ions of 1.0–2.5 M is prepared in accordance with the molar ratio of the metal elements in the general formula (I).

(2) Then the aqueous solution is used to impregnate the support mentioned above.

(3) The support impregnated with the active components is dried, calcined and activated at 450°–800° C. for 2–12 hours.

The present invention further relates to the use of the catalyst for combustion of carbon monoxide in the fluid catalytic cracking (FCC) process of petroleum refining.

THE DRAWINGS

DETAILED DESCRIPTION OF THE INVENTION

Figure 1:
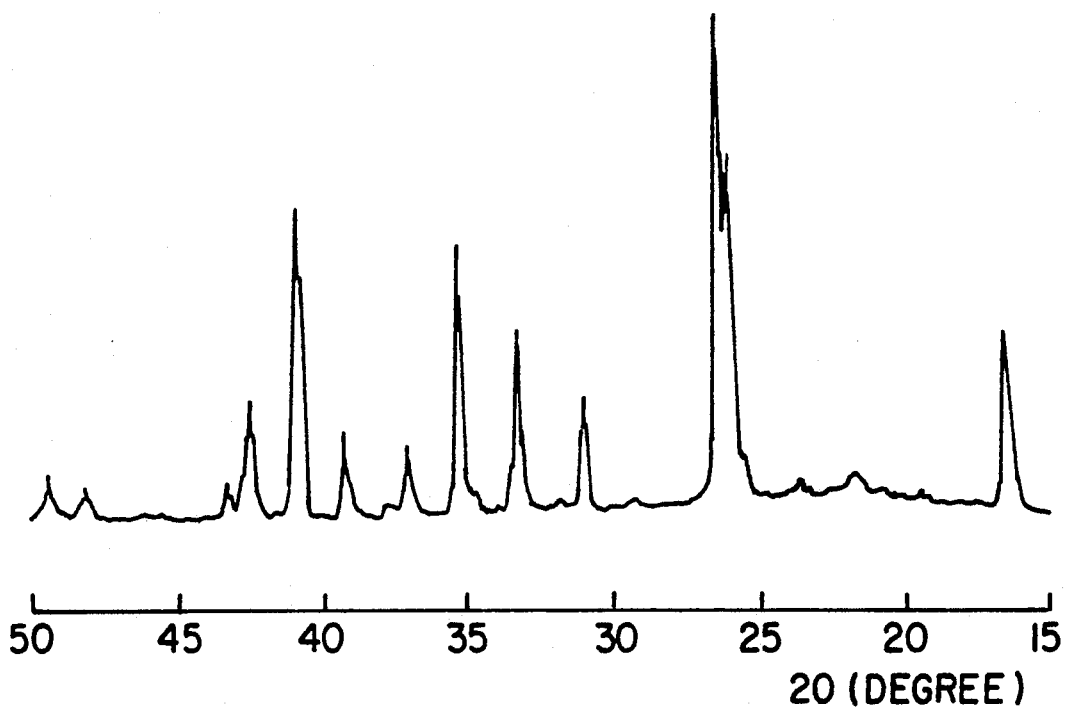
FIG. 1 is an X-ray diffraction pattern of the support prepared by the present invention.

The active components of the perovskite-type rare earth complex oxide combustion catalyst of the present invention is a perovskite-type compound as shown in the following general formula (I):

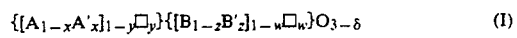

$$\{[A_{1-x}A'_x]_{1-y}\square_y\}\{[B_{1-z}B'_z]_{1-w}\square_w\}O_{3-\delta} \qquad (I)$$

wherein A represents rare earth metal element, preferably La, Ce or mixed rare earths, and most preferably, La or Ce; A' represents alkaline earth metal element, preferably Ca, Sr or Ba and most preferably Ca or Sr; $\square$ represents the vacancy in the structure; B and B' represent the transition metal element, preferably Ti, Cr, Co, Mn, Cu, Fe or Ni, and most preferably Ti, Cr, Co or Mn; $0 \leq x \leq 0.9$; $0 \leq y \leq 0.2$; $0 \leq z \leq 0.9$; $0 \leq w \leq 0.05$; $0 \leq \delta \leq 0.8$.

In the structure of the perovskite-type rare earth complex oxides, as A-site cations are partially replaced by A', or a certain amount of vacancies are maintained on the A-sites, in either case the electrovalence of the cations at B-sites can be partially varied. Under the condition of the structure type remaining unchanged, regulating the electrovalence of A' as well as the amounts of A' and the vacancy will lead to varied valence states of the cation of B-site located at the ligand-6. For example, in $$(La_{1-x}\square_x)(Co_{1-y}\square_y)O_{3-\delta} \text{ or}$$
$$[(La_{1-x}Sr_x)_{1-y}\square_y][Co_{1-z}\square_z]O_{3-\delta},$$

some of $Co^{4+}$, $Co^{3+}$ and $Co^{2+}$ exist proportionally at the B-sites. Hence the transfer of the electrical charge between the ions is supposed to occur in the complex oxide. Thus they possess the function of catalytic oxidization and catalytic reduction.

The preferred perovskite-type rare earth complex oxides of the present invention include:
$La_{0.8}Sr_{0.2}CoO_{3-\delta}$
$La_{0.7}Sr_{0.3}CoO_{3-\delta}$
$La_{0.6}Sr_{0.4}CoO_{3-\delta}$
$La_{0.7}Sr_{0.2}CoO_{3-\delta}$
$La_{0.9}CoO_{3-\delta}$
$LaMnO_{3-\delta}$
$La_{0.9}Ca_{0.1}MnO_{3-\delta}$
$La_{0.9}Sr_{0.1}MnO_{3-\delta}$
$La_{0.8}Ce_{0.1}Sr_{0.1}MnO_{3-\delta}$
$La_{0.7}Ce_{0.2}Sr_{0.1}MnO_{3-\delta}$
$La_{0.8}Ca_{0.2}CoO_{3-\delta}$
$La_{0.7}Ca_{0.3}CoO_{3-\delta}$
$La_{0.6}Ca_{0.4}CoO_{3-\delta}$
$La_{0.7}Ca_{0.2}CoO_{3-\delta}$
$La_{0.8}Sr_{0.2}Co_{0.6}Mn_{0.4}O_{3-\delta}$
$La_{0.8}Sr_{0.2}CrO_{3-\delta}$
$La_{0.8}Sr_{0.2}Co_{0.8}Ti_{0.2}O_{3-\delta}$
$La_{0.7}Sr_{0.3}Co_{0.8}Ti_{0.2}O_{3-\delta}$
$La_{0.7}Sr_{0.2}Co_{0.8}Ti_{0.2}O_{3-\delta}$
$La_{0.7}Ca_{0.2}CrO_{3-\delta}$
$La_{0.9}Sr_{0.1}FeO_{3-\delta}$
$La_{0.8}Ca_{0.2}CuO_{3-\delta}$
$La_{0.9}NiO_{3-\delta}$
$La_{0.8}Cu_{0.2}MnO_{3-\delta}$
$LaMn_{0.7}Cu_{0.3}O_{3-\delta}$
$LaMn_{0.6}Cu_{0.4}O_{3-\delta}$
$La_{0.9}Fe_{0.2}Co_{0.8}O_{3-\delta}$
$La_{0.8}Cu_{0.2}MnO_{3-\delta}$ The support of the perovskite-type rare earth complex oxide combustion catalysts of the present invention comprises mainly the mullite crystal; the mullite consists of $3Al_2O_3.2SiO_2-2Al_2O_3.SiO_2$. Both the mullite and the perovskite-type rare earth complex oxide are imperfect in crystal structure, and their crystallogical parameters match each other, hence the perovskite-type rare earth complex oxides can adhere closely to and disperse on the mullite. Moreover, the mullite crystal does not react chemically with the active components and is capable of stabilizing the perovskite-type rare earth complex oxides of imperfect structure. Therefore, the active components can be directly carried on the mullite crystal and their catalytic action can be fully exercised. The support in the present invention is mainly mullite, but it is probable that the support contains some alumina and silica as well as their complex oxides, amounting to less than 30% (wt). The support can be processed into different shapes as required. For instance, when it is used as the support of the catalyst for treating automobile exhaust gas, it can be processed into the spheric form, honeycomb form, tubular form and other forms, while in the fluid catalytic cracking process of petroleum refining, the shape of the support used for the combustion catalyst with respect to CO is usually in micro-spherical or powder-like form, preferably the microspheric support with a granularity of 10–400 μm, more preferably 20–200 μm, with a water-absorbability of 50–70%.

The process for preparing the support used in the present invention comprises;

(1) the starting materials containing alumina and silica are admixed into a mixture according to the prescribed ratio $Al_2O_3:SiO_2 = 1.0-3.0$, preferably 1.82.1:

(2) to the mixture is added a binder 0–5.0% (wt) (in terms of the total weight of the mixture) and a proper amount of water; the mixture is stirred until it is homogenized, and then spray-dried to form the microspherie support with a granularity of 10–400 μm, preferably 20–200 μm;

(3) the microspheric support is calcined for 2–10 hours at a temperature of 1200°–1600° C., preferably 1300°–1500° C.

The X-ray diffraction pattern shows that the main phase of the support prepared by the process is the mullite. The binder ususally used in the present invention is, for example, carboxymethylcellulose, polyvinyl alcohol etc.; the amount to be used depends on the starting material.

The processes already known can be adopted to carry the perovskite-type active components of the present invention directly on the support with the mullite as the main phase; the preferred process to be used is impregnation, that is, the starting material containing the various active components is processed into an aqueous solution containing the metallic cation, e.g. by using the nitrate or acetate solution. The mixed solution of metal-ion is prepared according to the $ABO_3$ stoichiometry. The total concentration of the metallic ions is approximately 1.0–2.5 M, preferably 1.5–2.0 M. Then the prepared support is added to the mixed solution. The impregnated support, after being dried, is calcined and activated at 450°–800° C., preferably 500°–700° C. for 2–12 hours. The steps as mentioned above can be repeated several times until the amount of active components on the support is reached. In terms of the weight of the support, the amount of the active components is usually 5–20% (wt). However, actually, the catalyst containing 8–15% (wt) of the active components can already fulfill a successful catalytic function.

The X-rays diffraction pattern shows that the crystallite on the surface of the catalyst prepared by the process is perovskite-type rare earth complex oxide.

As the active components and the support used in the present invention are both of imperfect structure, plus the fact that their crystallogical parameters are matchable and they do not react with each other chemically, the active components will form crystallites which will be uniformly and firmly dispersed on the surface of the support, and thus uniform catalyst will be formed when the solution of the metallic ions prepared by the $ABO_3$ stoichiometry is used to impregnate the said support which is then dried, calcined and activated successively. Therefore, the active components of the combustion catalyst of the present invention will not peel off from the support in the course of use and come into sufficient contact with the reacting gas, so that the function of the catalyst will be exercised to a maximum extent. Because the present invention has solved the problem relating to the carrying of the active components with the perovskite-type rare earth complex oxides, it opens up broad prospects for the use of perovskite-type rare earth complex oxides. As a substitute for the platinum combustion catalyst in the fluid catalytic cracking process of petroleum refining, the catalyst of the present invention can make possible the complete combustion of carbon monoxide, and at the same time the catalytic reduction of $NO_x$ can also be effected. In addition, the catalyst of the present invention can also be used in other fields such as automobile exhaust gas treatment.

The following specific examples are used to further illustrate the present invention, but they do not limit the scope of the invention.

EXAMPLE 1

9.2 kg of alumina gel containing 70% (wt) of $Al_2O_3$ was sufficiently and homogeneously mixed with 3.9 kg of silica gel containing 92% (wt) of $SiO_2$ with a proper amount of water. Into the mixture 0.25 kg of carboxymethylcellulose was then added. After being homogeneously stirred, the mixture was spray-dried and shaped into the microspheric support with a granularity in the range of 20-150 μm. Finally, the microspheric support was calcined at 1500° C. for 5-10 hours to obtain the microspheric support with a water absorbability of 61% (wt).

Japan Regaku D/MAX-RA X-ray diffractometer was used to measure the microspheric support obtained above under the condition of Cu Kα radiation at 40 KV and 150 mA; the results are as shown in FIG. 1. The said diffraction pattern shows that the main phase of the support obtained is mullite crystal.

228.1 g of $La_2O_3$ was dissolved in 215 ml of concentrated nitric acid. Water was then added to make up 1 liter of a solution in which the concentration of La ion was 1.4 M. 296.2 g of $Sr(NO_3)_2$ was dissolved in water to make 1 liter of a solution in which the concentration of Sr ion was 1.4 M. After that, 1 liter of $Co(NO_3)_2$ solution was prepared by dissolving 82.5 g of metallic cobalt in nitric acid in which the concentration of Co ion was 1.4 M. 350 ml of the La 1.4 M solution was homogeneously mixed with 100 ml of the Sr 1.4 M solution and 500 ml of Co 1.4 M solution to prepare a mixed solution of La, Sr and Co with a total ion concentration of 1.4 M.

To 36 ml of the mixed solution was added 60 g of the microspheric support. After being sufficiently impregnated, the microspheric support were dried and then calcined and activated at 500°-750° C. for 3-5 hours to obtain the catalyst, the carrying amount of whose active components was 10% (wt) (in terms of the total weight of the support).

Figure 2:
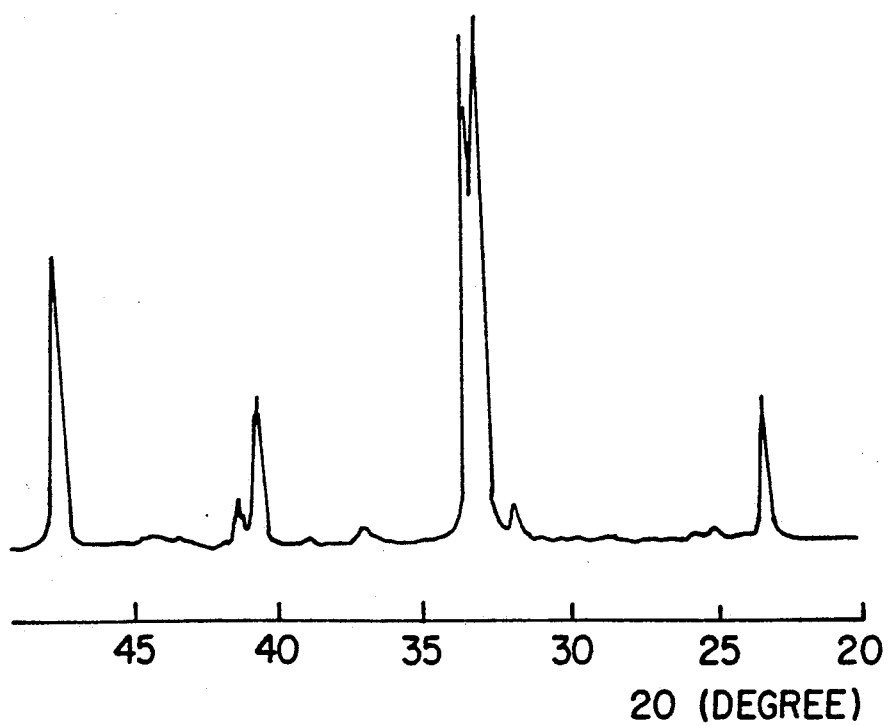
FIG. 2 is an X-ray diffraction pattern of the active components of the catalyst of the present invention.

The results of the XRD determination of the crystallite on the surface of the catalyst are as shown in FIG. 2. The pattern shows that the crystallite so obtained is of perovskite-type, namely, $ABO_3$ type complex oxide.

The catalyst was evaluated after being diluted with a diluent (such as the support) in the ratio of 1:10 and put on a fixed fluid-bed. A mixed gas of $O_2$(3% v), CO and $N_2$ (balance was used for the evalution. Under the condition of space-velocity 60000 $hr^{-1}$, the relationship between the conversion of CO and the reaction temperature under different concentrations of CO is shown in Table 1.

Figure 3:
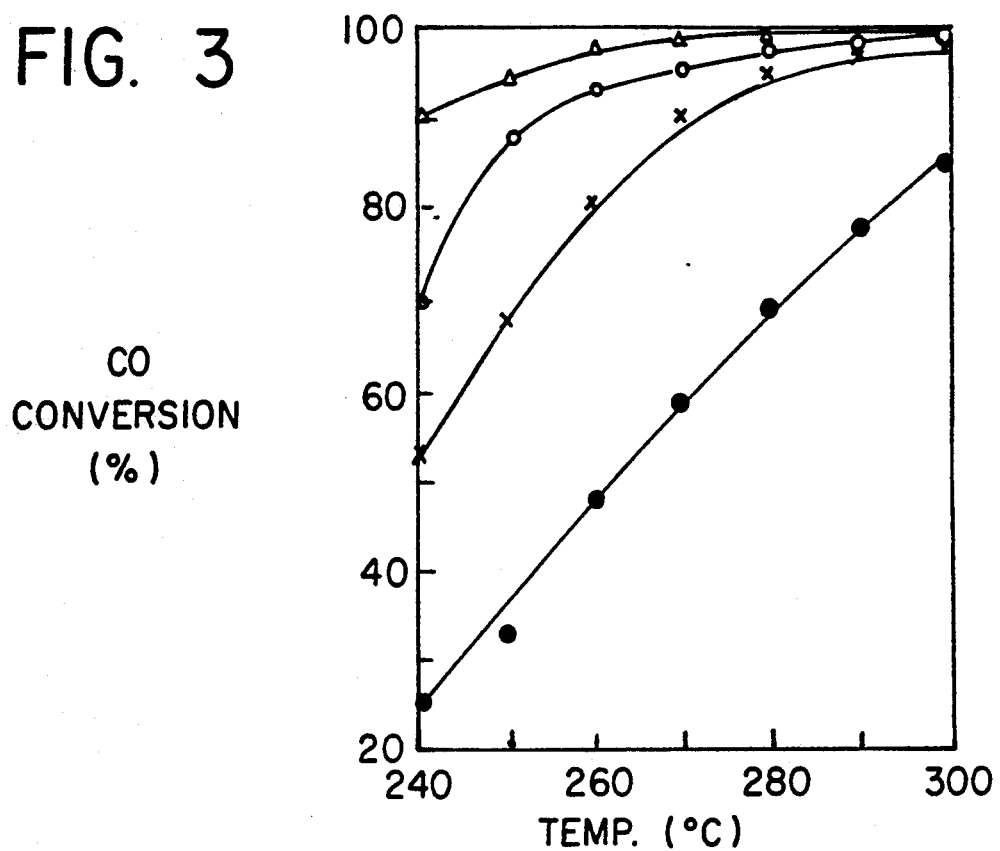
FIG. 3 is a correlative curves between the conversion of carbon monoxide vs. temperature under different space-velocities.

With a mixed gas in which the concentration of CO was 2.0% (v), the concentration of $O_2$ was 3.0% (v) and the balance was $N_2$, the correlativer curve between the conversion of CO and the reaction temperature under different space-velocity is shown as in FIG. 3. In FIG. 3, the curves plotted along Δ, ◯, X and . show the dependence of CO conversion on the reaction temperature at space-velocities of 30000, 45000, 60000 and 120000 $hr^{-1}$, respectively.

TABLE 1

| Correlation Between CO-Conversion and Reaction Temperature | | | |
|---|---|---|---|
| Reaction Temperature | CO-Conversion (%) | | |
| (°C.) | 1.0* | 2.0* | 5.0* |
| 240 | 77 | 53 | 44 |
| 250 | 88 | 68 | 54 |
| 260 | 93 | 80 | 64 |
| 270 | 96 | 90 | 70 |
| 280 | 99 | 95 | 79 |
| 290 | 100 | 98 | 86 |
| 300 | 100 | 99 | 91 |

*Volume percentage concentration of CO prior to conversion

The curves in FIG. 3 demonstrate that the catalyst of the present invention possesses high oxidizing activity capacity for meeting the requirement of high space-velocity.

Under the condition of space-velocity 30000 $hr^{-1}$ and temperature 280° C., the effect of $O_2$-concentration on the activity of the catalyst of the present invention is measured; the results are shown in Table 2.

TABLE 2

| Effect of $O_2$-Concentration on CO-Conversion | | | | |
|---|---|---|---|---|
| $O_2$-Concentration (% v) | | CO-Concentration (% v) | | |
| Before reaction | After reaction | Before reaction | After reaction | CO-Conversion (%) |
| 5.8 | 3.2 | 4.8 | 0.03 | 99.0 |
| 4.3 | 0.7 | 5.0 | 0.07 | 99.0 |
| 2.7 | 0.1 | 4.9 | 0.22 | 95.5 |
| 0.6 | 0.0 | 5.1 | 3.80 | 25.5 |

Note: The balance was $N_2$.

The data in Table 2 demonstrate that even under the condition where considerable oxygen has been consumed, the conversion of CO is still favorable. However, in the case of severe shortage of oxygen, the oxidation of CO will be greatly hindered.

The catalyst possesses not only the catalytic oxidizing function on CO and hydrocarbons (HC) but also the catalytic reducing function on nitrogen oxides ($NO_x$). Under the condition of 300° C. and space-volocity 10000 $hr^{-1}$, the catalytic reducing action of the catalyst on the mixed gas containing $NO_x$ is as shown in Table 3.

TABLE 3

Catalytic Oxidizing and Reducing Functions of the Rare Earth Complex Oxide Combustion Catalyst

|  | HC (ppm) | CO (%) | $NO_x$ (ppm) |
| --- | --- | --- | --- |
| Before reaction | 1850 | 5.0 | 540 |
| After reaction | 550 | 0.07 | 270 |
| Conversion (%) | 70 | 99 | 50 |

Table 4 shows the results of comparison between two cases: in one case a small amount of palladium was added to the catalyst prepared above whereas in the other case no palladium was added to the catalyst. The effectiveness of the catalysts was measured on the CO-conversion in a mixed gas system of CO 2.0% (v), $O_2$ 3.0% and $N_2$ 95% at the reaction temperature 300° C. and space velocity 30000 $hr^{-1}$.

TABLE 4

Catalytic Effect of the Rare Earth Complex Oxide Combustion Catalyst with Palladium Added

| Palladium % (wt) | 0.000 | 0.001 | 0.005 | 0.010 |
| --- | --- | --- | --- | --- |
| CO-Conversion (%) | 98.3 | 95.7 | 98.6 | 98.8 |

The data in Table 4 indicate that the catalytic properties of the rare earth combustion catalyst with palladium added show negligible advantage over those without palladium addition. There is no need to add the noble metal, palladium, for improving the catalytic properties of the perovskit-type rare earth complex oxide of the present invention as the combustion catalyst of CO in the fluid catalytic cracking process of the petroleum refining.

Figure 4:
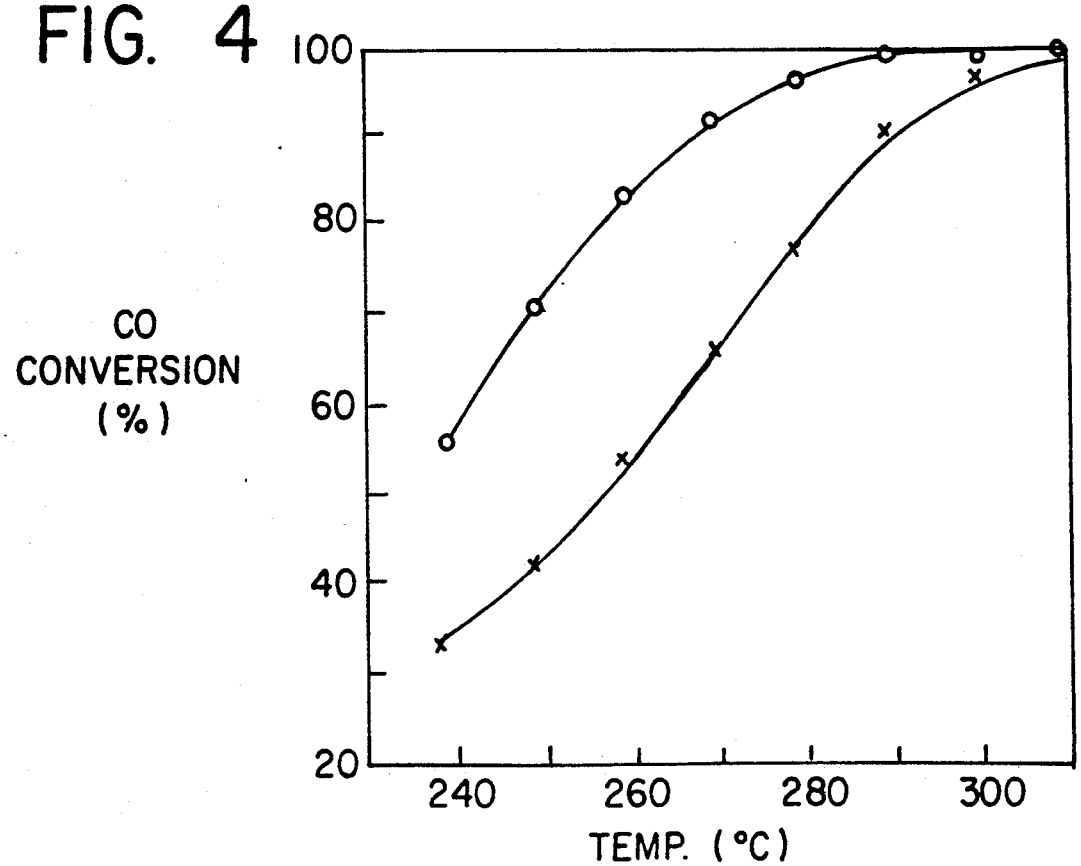
FIG. 4 is the comparison curves showing the conversion of carbon monoxide vs. temperature for the rare earth complex oxide combustion catalyst and platinum combustion catalyst respectively.

A comparative study was carried out by using a fixed fluid-bed for the evaluation of the combustion catalyst of the present invention and the combustion catalyst containing 0.05% (wt) platinum. After the two kinds of catalysts were diluted with a diluent (such as the support) in the ratio of 1:10, their effects on the CO-conversion were determined respectively, in a mixed gas containing CO 2.0% (v), $O_2$ 3.0% (v) and $N_2$ 95% (v), under the condition of different temperatures and a fixed space-velocity 30000 $hr^{-1}$. The results thereof are shown in FIG. 4, where the curve plotted along the circles (◯) shows the experimental results obtained by using the catalyst of the present invention and the curve along the cross (X) shows that those obtained by using the platinum-containing combustion catalyst. It can be seen from the plot that the activity of the perovskite-type rare earth complex oxide combustion catalyst of the present invention is higher than that of the platinum containing combustion catalyst. When the reaction temperature reaches 300° C., the activity of the latter approaches that of the former.

The Industrial Test of the Catalyst of the Present Invention

Using the catalyst mentioned above, experiments were carried out in a side by side fluid catalytic cracking (FCC) unit with a riser reactor and fast fluidized bed burner whose capacity is $8 \times 10^4$ tons/year. The total storage amount of the catalytic cracking catalyst in the reactor and the regenerator of that unit was about 10 tons, the catalytic cracking catalyst used was Y-15 molecular sieve catalyst and the feedstock used was the oil-fraction distilled under reduced pressure. In order to complete the combustion of CO in that unit, a platinum catalyst containing 0.05% of platinum (usually called platinum combustion promoter) was long used previously, and the feedin amount of platinum catalyst was 3 kg/day. As a substitute for the platinum combustion catalyst, an equal quantity of the catalyst of the present invention was used in the test for 34 consecutive days under the condition of main wind volume being 7800 $m^3$/hr, the temperature of the second dense phase bed in the regenerator being 725° C. and the temperature of the dilute phase bed in the regenerator being 709° C.

The industrial test results revealed that (1) the combustion catalyst of the present invention had no harmful effects on the quality and the yields of gasoline and diesel oil; (2) a 10° C. temperature drop was demonstrated in the dilute phase bed inside the regenerator when the combustion catalyst of the present invention was used instead of the platinum combustion catalyst. (3) the catalytic oxidizing capacity of the combustion catalyst of the present invention with respect to the oxidation of CO was greater than that of the platinum combustion catalyst: when the platinum combustion catalyst was used, the CO content in the exhaust gas of the regenerator was 200-300 ppm, whereas when the combustion catalyst of the present invention was used, the CO content in the exhaust gas of the regenerator was only 100-200 ppm, a drop of more than 100 ppm; (4) the combustion catalyst of the present invention had a better sustaining capability toward the catalytic oxidation of CO and, when the catalyst was fed once a day, its function for catalytic oxidation could last 24 hours. (5) the content of nitrogen oxides ($No_x$) in the exhaust gas of the regenerator was decreased. When the platinum combustion catalyst was used, the content of $NO_x$ in the exhaust gas of the regenerator was 300-400 ppm, and when the combustion catalyst of the present invention was used, the content was decreased to 100-200 ppm, with an average drop of 200 ppm.

EXAMPLE 2

5 kg of water-glass with a content of 27.5% (wt) $SiO_2$ was diluted with water to form a solution with a content of 5% (wt) $SiO_2$; and 17.97 kg of $Al_2(SO_4)_3 \cdot 18-H_2O$ was changed into a solution of 0.1 M. The two kinds of solution were mixed and stirred to form a colloid, which was filtered and washed. Then 20 g of polyvinyl alcohol was added to the silica-alumina filtered collodial cake obtained to form a pulp which was then spray-dried into the microspheric support with a granularity of 10–180 μm. After being calcined at 1400° C. for 8 hours, the support was obtained, which had a water absorbability of 57%.

228.1 g of $La_2O_3$ was dissolved in 214 ml of concentrated nitric acid, and water was added thereafter to form a solution with an La ion concentration of 1.4 M. 330.6 g of $Ca(NO_3)_2 \cdot 4H_2O$ was dissolved in water to form 1 liter of a solution with a Ca ion concentration of 1.4 M. 560.2 g of $Cr(NO_3)_3 \cdot 9H_2O$ was dissolved in water to form 1 liter of a solution having a Cr ion concentration of 1.4 M 350 ml of La 1.4 M solution, 150 ml of Ca 1.4 M solution and 500 ml of Cr 1.4 M solution were taken and mixed to form a liter of a mixed solution containing La, Ca and Cr (the total ion concentration of the solution was 1.4 M). 335 ml of the mixed solution was impregnated with 500 g of the microspheric support prepared in the present specific example, dried and then calcined and activated at 500°–750° C. for 3–4 hours to obtain the combustion catalyst.

The catalyst obtained was evaluated after being diluted with a diluent (such as the support) in the ration of 1:10 and put on a fixed fluid-bed under these conditions: reaction temperature 200°-300° C., space velocity 10000-60000 hr$^{-1}$, CO content in the mixed gas 2-6% (v), HC content 10000-70000 ppm, NO$_x$ content 500-1000 ppm. The CO content and HC content were measured by CO/HC infrared gas analyzer. The NO$_x$ content was measured by NO$_x$ digital monitor. The conversions of CO and HC were above 85% and 60% respectively.

EXAMPLE 3

514.6 g lanthanum acetate [La(C$_2$H$_3$O$_2$)$_3$·1.5H$_2$O] was dissolved in water to form 1 liter of a solution having an La ion concentration of 1.5 M. 308.4 g of strontium acetate [Sr(C$_2$H$_3$O$_2$)$_2$] was dissolved in water to form, according to the stoichiometry, a solution having a Sr ion concentration of 1.5 M. After than 373.6 g of cobalt acetate [Co(C$_2$H$_3$O$_2$)$_2$·4H$_2$O] was dissolved in water to form a solution with a Co ion concentration of 1.5 M. 300 ml of La 1.5 M solution, 200 ml of Sr 1.5 M solution and 500 ml of Co 1.5 M solution were taken and mixed together to form 1 liter of La, Sr and Co solution (the total ion concentration of the solution was 1.5 M). 450 ml of the above mixed solution was then used to impregnate 900 g of the microspheric support obtained as shown in Example 2. The microspheric support, after being dried, was calcined and activated at 750°-780° C. for 2 hours. The catalytic activity of the catalyst was measured according to the evaluation requirements indicated in Example 2; the conversion of CO was 90%.

EXAMPLE 4

350 ml of 1.7 M lanthanum nitrate aqueous solution, 100 ml of 1.7 M calcium nitrate aqueous solution and 500 ml of 1.7 M cobalt nitrate aqueous solution were admixed to form 1 liter of a mixed solution containing La, Ca and Co ions (the total ion concentration of the solution was 1.615 M). 38.5 ml of this mixed solution was used to impregnate 70 g of the microspheric support obtained as shown in Example 1. The impregnated microspheric support was dried and then calcined and activated at 560°-590° C. for 3 hours. The catalytic activity of the above catalyst was measured according to the evaluation requirements indicated in Example 2, wherein the conversions of CO, nitrogen oxides and HC were 90%, 49% and 65% respectively.

EXAMPLE 5

Following the process described in Example 1, 114.0 g of La$_2$O$_3$, 63.5 g of Sr(NO$_3$)$_2$, 232.8 g or Co(NO$_3$)$_2$·6H$_2$O and 48 g of Ti(SO$_4$)$_2$ were used to form 1 liter of a mixed solution containing La, Sr, Co and Ti ions (the total ion concentration of the solution was 2 M). 100 g of the microspheric support prepared as shown in Example 1 was impregnated in 60 ml of the mixed solution, dried and then calcined and activated at 670°-700° C. for 2-5 hours. The catalytic activity of the catalyst was measured according to the evaluation requirements indicated in Example 2; the conversion of CO was above 95%.

EXAMPLE 6

Following the process described in Example 1, 117.3 g of La$_2$O$_3$, 39.1 g of Ce(NO$_3$)$_3$·6H$_2$O, 19.1 g of Sr(NO$_3$)$_2$ and 322.1 g of 50% Mn(NO$_3$)$_2$ were used to form 1 liter of a mixed solution containing La, Ce, Sr and Mn ions (the total ion concentration of the solution was 1.8 M). 1 kg of the microspheric support prepared as shown in Example 2 was impregnated in 500 ml of the mixed solution, dried and then calcined and activated at 450°-500° C. for 1-3 hours. The catalytic activity of the catalyst was measured, according to the evaluation requirements indicated in Example 2; the conversion of CO was as high as 90%.

EXAMPLE 7

315 ml of 2 M lanthanum nitrate aqueous solution, 135 ml of 2 M calcium nitrate aqueous solution and 450 ml of 2 M cobalt nitrate aqueous solution were admixed to form 1 liter of a mixed solution containing La, Ca and Co ions (the total concentration of the solution was 1.8 M). 500 g of the microspheric support prepared as shown in Example 1 was impregnated in 300 ml of the nixed solution, dried and then calcined and activated at 500°-520° C. for 2-3 hours. The catalytic activity of the catalyst was measured, according to the evaluation requirements indicated in Example 2; the conversions of CO and HC were above 90% and 62%, respectively.

EXAMPLE 8

350 ml of 2 M lanthanum nitrate aqueous solution, 150 ml of 2 M strontium nitrate aqueous solution and 500 ml of 2 M cobalt nitrate aqueous solution were mixed to form 1 liter of a mixed solution containing La, Sr and Co ions (the total ion concentration of the solution was 2 M). 500 g of the microspheric support prepared as shown in Example 1 was impregnated in 250 ml of the mixed solution, dried and then calcined and activated at 480°-520° C. for 2-4 hours. The catalytic activity of the above catalyst was measured, according to the evaluation requirements indicated in Example 2; the conversions of CO, NO, and HC were above 98%, 50% and 72% respectively.

EXAMPLE 9

900 ml of 1.5 M lanthanum nitrate aqueous solution and 1 liter of 1.5 M cobalt nitrate aqueous solution were mixed to form 1.9 liter of a mixed solution containing La and Co ions (the total ion concentration was 1.5 M). 50 g of the microspheric support prepared as shown in Example 1 was impregnated in 30 ml of the mixed solution, dried and then calcined and activated at 600°-630° C. for 2-5 hours. The catalytic activity of the catalyst was measured according to the evaluation requirements indicated in Example 2; the conversions of CO and nitrogen oxides were 99% and 51% respectively.

EXAMPLE 10

500 ml of 1.9 M lanthanum nitrate solution was mixed with 340 g of 50% Mn(NO$_3$)$_2$ to form 1 liter of a mixed solution containing La and Mn (the total ion concentration of the solution was 1.9 M). 50 g of the microspheric support prepared as shown in Example 1 was impregnated in 30 ml of the mixed solution, dried and then calcined and activated at 520°-550° C. for 3-5 hours. The catalytic activity of the catalyst was measured according to the evaluation requirements indicated in Example 2, the conversions of CO and HC were 93% and 63% respectively.

EXAMPLE 11

400 ml of 2 M lanthanum nitrate solution and 100 ml of 2 M strontium nitrate solution were mixed with 200 ml of 2 M manganese nitrate solution and 300 ml of 2 M Cobalt nitrate solution to form 1 liter of a mixed solution containing La, Sr, Mn and Co ions (the total ion concentration of the solution was 2 M). 50 g of the microspheric support prepared as shown in Example 1 was impregnated in 25.5 ml of the mixed solution, dried and then calcined and activated at 600°–630° C. for 2–4 hours. The catalytic activity of the catalyst was evaluated according to the evaluation requirements indicated in Example 2; the conversion of CO was above 90%.

EXAMPLE 12

400 ml of 1.95 M lanthanum nitrate aqueous solution and 100 ml of 1.95 M copper nitrate aqueous solution were admixed with 500 ml of 1.95 M manganese nitrate solution to form 1 liter of a mixed solution containing La, Cu and Mn ions (the total ion concentration of the solution was 1.95 M). 750 g of the microspheric support prepared as shown in Example 1 was impregnated in 450 ml of the mixed solution, dried and then activated at 625° C. for 2.5 hours. The catalytic activity of the catalyst was measured according to the evaluation requirements indicated in Example 2; the conversions of CO and HC were as high as 98% and 73% respectively.

EXAMPLE 13

142.6 g of $La_2O_3$ was dissolved in 134 ml of concentrated nitric acid. To the solution was added 219.2 g of 50% $Mn(NO_3)_2$ and 63.4 g of $Cu(NO_3)_2 \cdot 3H_2O$, and water was then added to make up 1 liter of a mixed solution containing La, Mn and Cu ions (the total ion concentration of the solution was 1.75 M). 400 g of the microspheric support prepared as shown in Example 1 was impregnated in 220 ml of the mixed solution, dried and then activated at 515° C. for 2 hours. The catalytic activity of the catalyst was measured according to the evaluation requirements indicated in Example 2; the conversion of CO was as high as 99%, and that of HC was above 47%.

We claim:

1. A rare earth complex oxide combustion catalyst comprising active components having the following formula (I)

$$\{[A_{1-x}A'_x]_{1-y}\square_y\}\{[B_{1-z}B'_z]_{1-w}\square_w\}O_{3-\delta} \qquad (I)$$

wherein A represents rare earth-metal element; A' represents alkaline earth metal element; $\square$ represents the vacancy in the structure; B and B' represent transition metal element; $0 \leq x \leq 0.9$; $0 \leq y \leq 0.2$; $0 \leq z \leq 0.9$; $0 \leq w \leq 0.05$; $0 \leq \delta \leq 0.8$; and a support having mullite as a main phase and additional phases of alumina, silica, and their complex oxides; wherein said addition phases are less than 30 percent by weight of said support; and wherein said active elements are impregnated onto said support.

2. A catalyst according to claim 1, wherein said rare earth metal element is La, Ce, mixed rare earth, or a combination of any of the foregoing; said alkaline earth metal element is Ca, Sr, or Ba; and said transition metal element is Ti, Cr, Co, Mn, Cu, Fe, Ni, or a combination of any of the foregoing.

3. A catalyst according to claim 2, wherein said rare earth metal element is La, Ce, or a combination thereof said alkaline earth metal is Ca or Sr; and said transitional metal element is Ti, Cr, Co, Mn, or a combination of any of the foregoing.

4. A catalyst according to claim 2, wherein said active component is $La_{0.7}Sr_{0.2}CoO_{3-\delta}$
$La_{0.7}Ca_{0.3}CoO_{3-\delta}$
$La_{0.7}Sr_{0.3}CoO_{3-\delta}$
$La_{0.9}CoO_{3-\delta}$
$LaMnO_{3-\delta}$
$La_{0.8}Sr_{0.2}Co_{0.6}Mn_{0.4}O_{3-\delta}$
$La_{0.7}Ca_{0.2}CoO_{3-\delta}$
$La_{0.7}Sr_{0.3}Co_{0.8}Ti_{0.2}O_{3-\delta}$
$La_{0.7}Sr_{0.3}CrO_{3-\delta}$
$La_{0.8}Ce_{0.1}Sr_{0.1}MnO_{3-\delta}$
$La_{0.6}Sr_{0.4}CoO_{3-\delta}$
$La_{0.8}Cu_{0.2}MnO_{3-\delta}$ or
$LaMn_{0.7}Cu_{0.3}O_{3-\delta}$.

5. A catalyst according to claim 1, wherein said support is a microspheric support with a granularity of 10–400 μm and a water absorbability of 50–70%.

6. A catalyst according to claim 5, wherein said support has a granularity of 20–200 μm.

7. A catalyst according to claim 1, wherein said support may contain some alumina and silica as well as their complex oxides amounting to less than 30% (wt).

8. A catalyst according to claim 1, wherein the amount of said active component carried on said support (in terms of the weight of the support) is 5–20% (wt).

9. A catalyst according to claim 8, wherein the amount of active component carried on said support (in terms of weight of the support) is 8–15% (wt).

10. A process for preparing rare earth complex oxide combustion catalyst, said catalyst comprising:

the active components of the perovskite-type expressed by the following general formula (I)

$$\{[A_{1-x}A'_x]_{1-y}\square_y\}\{[B_{1-z}B'_z]_{1-w}\square_w\}O_{3-\delta} \qquad (I)$$

wherein A represents rare earth metal element, A' represents alkaline earth metal element; $\square$ represents the vacancy in the structure; B and B' represent transition metal elements; $0 \leq x \leq 0.9$; $0 \leq y \leq 0.2$; $0 \leq z \leq 0.9$; $0 \leq w \leq 0.05$; $0 \leq \delta \leq 0.8$; and a support using mullite as main phase, said process comprises:

(1) preparing an aqueous solution of soluble salts having a total ion concentration of 1.0–2.5 M in accordance with the molar ratio of the metal elements required by the active components in general formula (I);

(2) impregnating the support with the aqueous solution to yield an active component impregnated support; and (3) drying, calcining, and activating at 450°–800° C. for 2–12 hours the impregnated support.

11. A process according to claim 10, wherein the total ion concentration of the metals in the aqueous solution of soluble salts is 1.5–2.0 M, the calcining activating temperature is 500°–700° C. and the water-soluble metal salts are nitrate or acetate.

12. A process according to claim 10, wherein said rare earth metal elements is La, Ce or mixed rare earth elements alkaline earth metal element is Ca, Sr or Ba and the transition metal element is Ti, Cr, Co, Mn, Fe or Ni.

13. A process according to claim 12, wherein said rare earth metal element is La or Ce; said alkaline metal element is Ca or Sr; and said transition metal element is Ti, Cr, Co or Mn.

14. A process according to claim 10, wherein said support is a microspheric support having a granularity of 10–400 μm and a water absorbability rate of 50–70%.

15. A process according to claim 14, wherein said support has a granularity of 20–200 μm.

16. A process according to claim 15, wherein said support is prepared by:
   (1) mixing the feedstock containing silica and alumina according to the ratio $Al_2O_3:SiO_2 = 1.0–3.0$ to prepare a mixture;
   (2) adding into the mixture 0–5.0% (wt) binder and a proper amount of water; stirring and then spray drying the mixture to form a microspheric support with a granularity of 10–400 μm; and
   (3) calcining and activating the microspheric support at 1200°–1600° C. for 2–12 hours.

17. A process according to claim 16, wherein the mixture is made according to the ratio $Al_2O_3:SiO_2 = 1.8–2.1$ and the microspheric support formed by spray-drying fall within a granularity range 20–200 μm and the temperature of calcination and activation is 1300°–1500° C.

18. A rare earth complex oxide combustion catalyst comprising perovskite-type active components indicated in the following general formula (I)

$$\{[A_{1-x}A'_x]_{1-y}\square_y\}\{[B_{1-z}B'_z]_{1-w}\square_w\}O_{3-\delta} \qquad (I)$$

wherein A represents rare earth metal element; A' represents alkaline earth metal element; □ represents the vacancy in the structure; B and B' represent transition metal element; $0 \leq x \leq 0.9$; $0 \leq y \leq 0.2$; $0 \leq z \leq 0.9$; $0 \leq w \leq 0.05$; and $0 \leq \delta \leq 0.8$; wherein y and w cannot both be 0; and a support using mullite as a main phase; wherein said active components are carried directly on said support.

19. A process for preparing rare earth complex oxide combustion catalyst, said catalyst comprising:
   the active components of the perovskite-type expressed by the following general formula (I)

$$\{[A_{1-x}A'_x]_{1-y}\square_y\}\{[B_{1-z}B'_z]_{1-w}\square_w\}O_{3-\delta} \qquad (I)$$

wherein A represents rare earth metal element, A' represents alkaline earth metal element; □ represents the vacancy in the structure; B and B' represent transition metal elements; $0 \leq x \leq 0.9$; $0 \leq y \leq 0.2$; $0 \leq z \leq 0.9$; and $0 \leq w \leq 0.05$; $0 \leq \delta \leq 0.8$; wherein y and w cannot both be 0; and a support using mullite as main phase said process comprises:
   (1) preparing an aqueous solution of soluble salts having a total ion concentration of 1.0–2.5 M in accordance with the molar ratio of the metal elements required by the active components in general formula (I);
   (2) impregnating the support with the aqueous solution to yield an active component impregnated support; and
   (3) drying, calcining, and activating at 450°–800° C. for 2–12 hours the impregnated support.

* * * * *